United States Patent [19]
Armstrong et al.

[11] Patent Number: 6,149,136
[45] Date of Patent: Nov. 21, 2000

[54] DISTRIBUTOR FOR PACKED LIQUID-VAPOR CONTACT COLUMN

[75] Inventors: Phillip Andrew Armstrong, Orefield, Pa.; Mohammad Ali Kalbassi, Walton-on-Thames; Derek Miller, Guildford, both of United Kingdom

[73] Assignee: Air Products and Chemicals, Inc., Allentown, Pa.

[21] Appl. No.: 09/009,093

[22] Filed: Jan. 20, 1998

[51] Int. Cl.[7] .................................................. B01F 3/04
[52] U.S. Cl. ........................... 261/19; 261/97; 261/106; 261/110
[58] Field of Search ............................. 261/19, 97, 103, 261/106, 110; 202/158

[56] References Cited

U.S. PATENT DOCUMENTS

| | | | |
|---|---|---|---|
| 3,285,587 | 11/1966 | Huber | 202/158 |
| 3,392,966 | 7/1968 | Eckert | 261/97 |
| 4,776,989 | 10/1988 | Harper et al. | 261/97 |
| 4,808,350 | 2/1989 | Robbins et al. | 261/97 |
| 4,816,191 | 3/1989 | Berven et al. | 261/97 |
| 4,839,108 | 6/1989 | Silvey | 261/97 |
| 5,013,491 | 5/1991 | Nutter | 261/97 |
| 5,061,407 | 10/1991 | Nutter | 261/97 |
| 5,132,055 | 7/1992 | Alleaume et al. | 261/97 |
| 5,354,460 | 10/1994 | Kearney et al. | 210/198 |
| 5,484,578 | 1/1996 | Muldowney et al. | 261/97 |
| 5,518,667 | 5/1996 | Lehman | 261/97 |

FOREIGN PATENT DOCUMENTS 2752391  3/1985  Germany.

OTHER PUBLICATIONS

"Accurately Assess Packed–Column Efficiency" from Chemical Engineering Progress, pp 27–44, Jul. 1995.

Kearney et al, "A Liquid Distributor for Industrial Chromatography Columns: An Approach Based on Fractal Geometry", presented at the Fifth World Congress of Chemical Engineering in San Diego, California, Jul. 14–18, 1996.

Pluss et al., "Design Aspects of Packed Columns Subjected to Wave Induced Motions", (I. Chem. E. Symp. Ser. 104 (1987) A259).

Tanner et al., "Modelling The Performance of a Packed Column Subjected to Tilt". (Trans. I ChemE 74 (1996) A177).

*Primary Examiner*—C. Scott Bushey
*Attorney, Agent, or Firm*—Willard Jones, II

[57] ABSTRACT

A liquid distributor for a packed liquid-vapor contact column includes a header tank; a liquid distribution plate having vapor riser passages and a multiplicity of discrete reservoir cells each having an aperture for flow of liquid therefrom into the column; and conduits for feeding liquid from the header tank into each cell. The liquid distribution plate preferably has a uniform criss-cross structure with alternating vapor riser passages and reservoir cells of identical shape and size. The conduits may have two or more sections each feeding a discrete group of reservoir cells from a location of the header tank at an elevation spaced from that of the other section(s). The distributor compensates for column sway or tilt when mounted on, for example, a ship.

21 Claims, 3 Drawing Sheets

DISTRIBUTOR FOR PACKED LIQUID-VAPOR CONTACT COLUMN

TECHNICAL FIELD OF THE INVENTION

The present invention relates to the distribution of liquid feed into a liquid-vapor contact column and provides a distributor for that purpose. It has particular, but not exclusive, application to columns, especially for cryogenic air separation, at a location, such as off-shore, subject to movement causing the column to sway or tilt from the vertical.

BACKGROUND OF THE INVENTION

It is well known that the use of structured packing in distillation columns has many advantages where low pressure drop is important. However, packed column performance is very dependent on creating and maintaining a balance between the downward flow of liquid and upward flow of vapor locally in the packing. The distribution of the liquid and vapor within the packing is influenced by the initial presentation of these fluids to the packing, and the particular characteristics of the packing.

For a variety of reasons, the distribution of liquid within the packing is more sensitive than the distribution of vapor to initial presentation. Typically, initial presentation of liquid is made by a liquid distributor, consisting of a collection of interconnecting open troughs with irrigation holes in the base which feed liquid to the packing below. A uniform liquid level in the troughs of the liquid distributor is a minimum requirement to achieve uniform flow from the irrigation holes.

In practice, difficulties arise in creating uniform initial liquid distribution. For example, a variety of factors affect uniformity of liquid level in a liquid distributor, including hydrodynamic resistance internal to the liquid distributor, misalignment during installation of the distributor, and column tilt. The design of liquid distributors for off-shore applications presents some particularly demanding problems. The action of both wind and waves causes significant movement of a shipboard distillation column; this movement is particularly of concern when it causes the column to tilt away from the vertical in a swaying motion, causing side-to-side movement of liquid within a liquid distributor. The uniformity of liquid level in a typical liquid distributor is significantly compromised during ship movement, causing flow non-uniformity from the irrigation holes, leading to maldistribution within the packed column.

Numerous approaches to providing initial liquid distribution have been proposed including trough distributors, fractal distributors, overflowing distributors, and irrigation-hole-multiplying distributors (see, for example U.S. Pat. Nos. 4,816,191 (Berven & Meyer), U.S. Pat. No. 5,132,055 (Alleaume et al) & U.S. Pat. No. 5,354,460 (Kearney et al), German Published Patent Application No. 2,752,391 (Streuber), and a paper by M. Kearney & V. Kochergin entitled "A Liquid Distributor for Industrial Chromatography Columns: An Approach Based on Fractal Geometry" presented at the Fifth World Congress of Chemical Engineering in San Diego, Calif., Jul. 14–18, 1996). All of these rely to some extent on a uniform liquid level to achieve flow uniformity and are subject to liquid level non-uniformity created by the aforementioned mechanisms. For example, none of these approaches is suitable for a non-vertical column, nor for a periodically tilting column on, for example, a ship.

Alternative approaches to those relying on a uniform liquid head in a trough have been reported. Pluss and Bomio (I. Chem. E. Symp. Ser. 104 (1987) A259) describe a pipe-distributor which was shown to be superior to a trough-type distributor in a tilting column. This pipe distributor is a type of pressurised distributor consisting of a closed manifold, such as a pipe, with irrigation holes directing liquid down into the packing. The number and size of the holes are such that there is a back pressure significantly greater than the difference in head caused by the distributor being tilted. In this way, the distribution becomes relatively even regardless of column tilt.

Unfortunately, there are practical difficulties associated with the pressurised distributor approach. For example, if the distributor back pressure were generated by a pump, the pumped liquid would have to be subcooled to avoid flashing in the pressurised manifold because flashing would lead to maldistribution by formation of bubbles impeding liquid flow in the manifold. Subcooling can be problematical if the liquid is entering the coolest section of the distillation column and there are no cooler fluids to provide subcooling duty. The pumped option is also difficult if liquid is being fed from one section of a column to another, without leaving the column shell.

Another approach, although fundamentally similar to the pressurised distributor, was used by Tanner, et al., (Trans. IChemE 74 (1996) A177) in which a high liquid head in a distributor was shown to yield superior mass transfer performance to a low head in a tilted column, because the variation in head due to tilt on a percentage basis was lower with the high average head than with the low average head. Unfortunately, the elevation required to provide the required back pressures for good distribution is excessive and would severely impact on both column height and cost.

It is an object of the present invention to provide a liquid distributor which permits of uniform distribution to a liquid-vapor contact column during sway or tilt such as that encountered by a shipboard cryogenic air separation distillation column.

SUMMARY OF THE INVENTION

In a first aspect, the present invention is a liquid distributor for a packed liquid-vapor column comprising a header tank;

a liquid distribution plate having vapor riser passages and a multiplicity of discrete reservoir cells each having an aperture for flow of liquid therefrom into the column; and conduit means for feeding liquid from the header tank into each cell.

In a second aspect, the invention is the liquid distribution plate for a packed liquid-vapor column comprising vapor riser passages and a multiplicity of discrete reservoir cells each having an aperture for flow of liquid therefrom into the column.

The distributor of the invention is a two stage distributor consisting of a primary distributor (viz. the header tank & conduit means) and secondary distributor (viz. the liquid distribution plate). The primary distributor feeds liquid to the secondary distributor, which feeds liquid to the packing. The secondary distributor consists of a large number of individual reservoir cells which cannot communicate with each other and the primary distributor feeds liquid individually into each cell in the secondary distributor. The cross-sectional area and height of each cell reduces the effect of column tilting on the head of liquid above the liquid flow aperture(s) therein and hence on the liquid flow through the aperture(s) into the column packing.

As described above, the prior art had two main approaches to solving the problem of non-uniform liquid levels in liquid distributors leading to initial maldistribution of the liquid (viz. pressurised distributors and tall head tanks). The problems associated with these have been primarily associated with pumps and excessive column height, respectively. The present invention circumvents these problems by combining the concept of a pressurised distributor with a modest-sized header tank to create a primary distributor. The primary distributor works in conjunction with a secondary distributor composed of a lattice of small vessels (reservoir cells) which act to buffer any shortcomings of the primary distributor. No pumps are required, and thus the problems associated with subcooling, etc., are avoided. Moreover, the modest-sized header tank requires little or no extra column height, resulting in a significant capital cost savings over the prior art. The present invention is characterized by the combination of a header tank and (secondary) distribution plate, whose construction is such that any short-comings of distribution from the header tank are dampened.

DETAILED DESCRIPTION OF THE INVENTION

Figure 1:
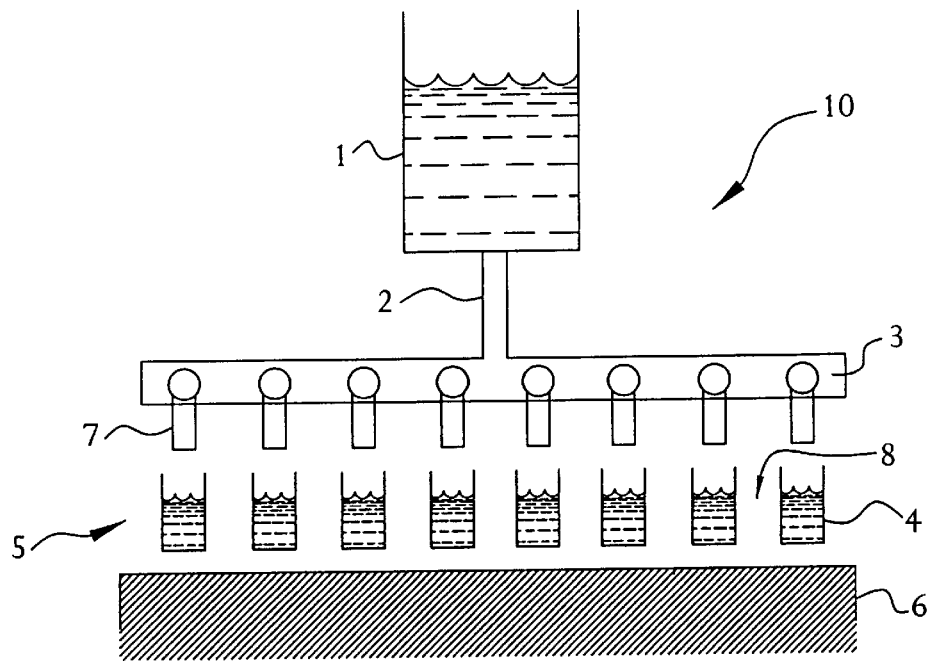
FIG. 1 is a schematic representation of a liquid distributor in accordance with the present invention and FIG. 2 is a plan view of the liquid distribution plate of the distributor of FIG. 1.

The present invention provides a liquid distributor for a packed liquid-vapor column comprising
- a header tank;
- a liquid distribution plate having vapor riser passages and a multiplicity of discrete reservoir cells each having an aperture for flow of liquid therefrom into the column; and
- conduit means for feeding liquid from the header tank into each cell.

As mentioned above, the distributor of the present invention can be considered as having a primary distributor constituted by the header tank and conduit means and a secondary distributor constituted by the distribution plate. The secondary distributor has a large number of individual reservoir cells which cannot communicate with each other but which each have one or more apertures through which liquid is fed to the column packing.

The primary distributor feeds liquid from the header tank through the conduit means into each reservoir cell in the secondary distributor. Typically, the conduit means consists of one or more main supply pipes connected to the header tank, branch pipes extending from the main pipe(s) over rows or series of reservoir cells, and secondary delivery tubes dedicated to feeding a single cell from an adjacent branch pipe. Since the primary distributor only requires relatively modest back pressure, only modest elevation of the header tank is required thereby limiting the additional height of the column required to accommodate the distributor of the present invention.

The primary distributor is only able to smooth out the impact of column movement to a limited extent and hence the feed to the secondary distributor will still vary to an unacceptable level. This variation is overcome by the reservoir capacity of the cells, each cell being designed to provide sufficient liquid residence time to buffer out feed variations. This is accomplished by dimensioning the cross-sectional area, height and aperture size for each cell according to column dimensions and performance so that anticipated column tilting has minimal effect on the head of liquid above the cell aperture(s). Due to the fact that the liquid level in a cell will vary linearly with the difference between flow in and flow out, but the flow out is proportional to the square root of the liquid level, the variation in flow out of the cell is very effectively dampened compared to the inlet flow.

The combination of primary and secondary distributors described above is designed to cope with horizontal column oscillations, and, in addition, the primary distributor is designed with sufficient back pressure to overcome the offsets in average position away from the vertical.

The present invention also provides a liquid distribution plate for a packed liquid-vapor column comprising vapor riser passages and a multiplicity of discrete reservoir cells each having an aperture for flow of liquid therefrom into the column.

Preferably, the volume of each reservoir cell is of uniform cross-section through the liquid distribution plate and suitably is of rectangular, especially square, cross-section. Usually, each cell is open at its top and has a bottom wall containing a single centrally located liquid flow aperture. Conveniently, all the cells in the body of the liquid distribution plate are of the same shape and size but those at the edges are shaped to fit the column wall.

Usually the liquid distribution plate will have vapor riser passages alternating with the reservoir cells, which passages preferably are of the same shape and size as the reservoir cells but open at both ends to permit the free flow of vapor therethrough.

In a presently preferred embodiment, the distribution plate is of a checkerboard (i.e. uniform criss-cross) structure with cells of identical square cross-section covering the whole cross-section of the column above the packing and with open (vapor riser) passages alternating with reservoir cells.

Figure 3A:
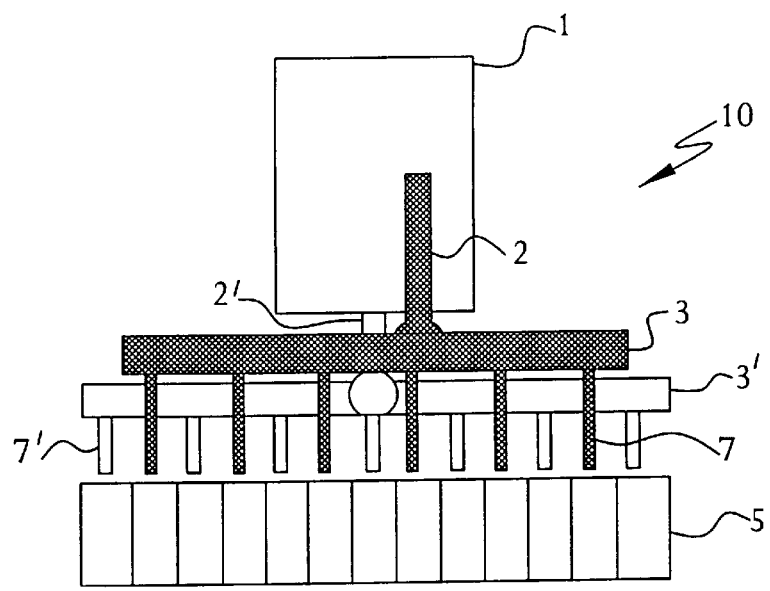
FIG. 3A is a front view of an embodiment of the present invention having two sections of conduit means.
Figure 3B:
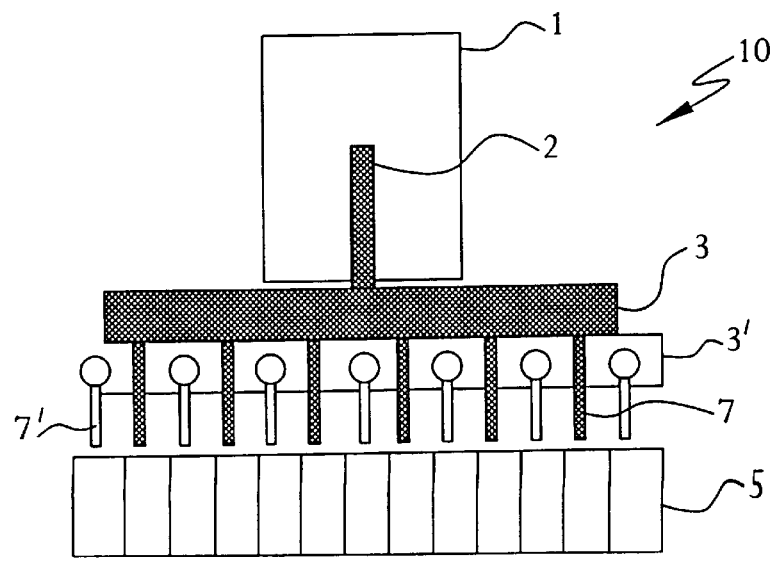
FIG. 3B is a side view of the aforesaid embodiment of the present invention having two sections of conduit means.
Figure 3C:
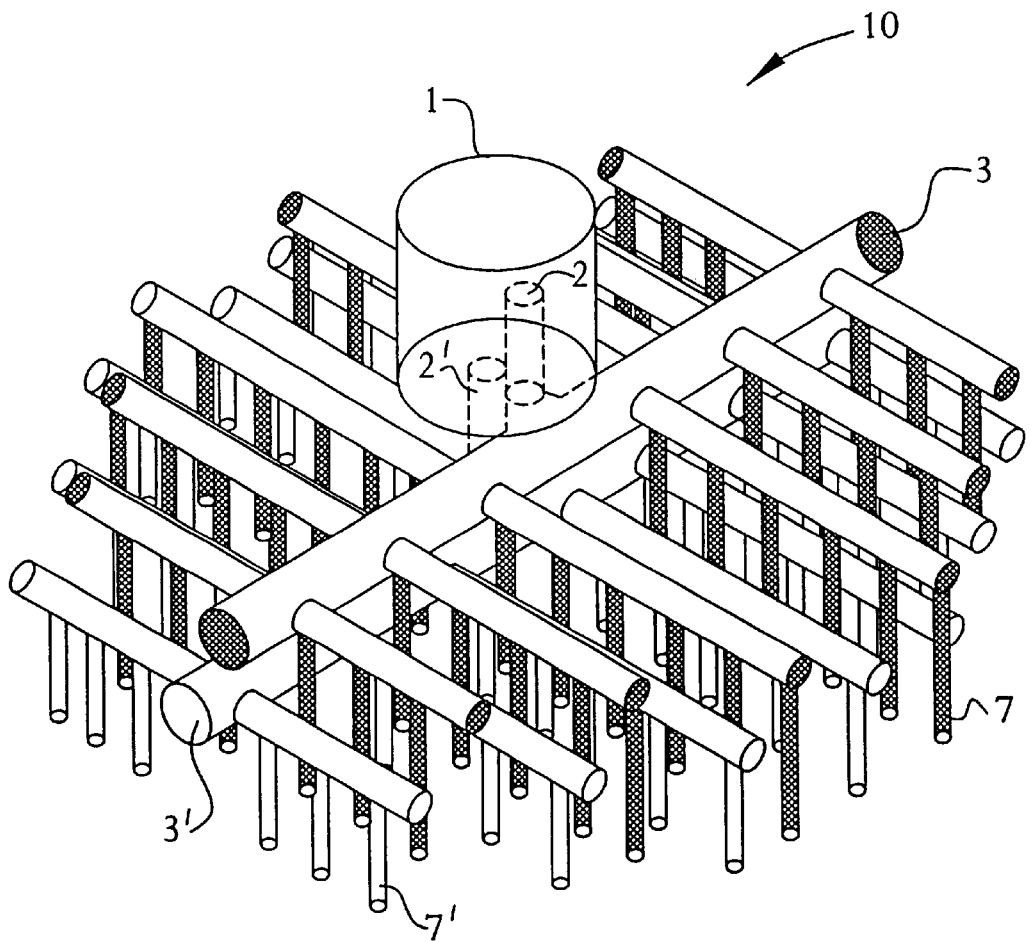
FIG. 3C is a perspective view of the two sections of conduit means in the embodiment illustrated in FIGS. 3A and 3B.

The distributor of the present invention can be adapted to accommodate a column required to operate over a wide range of flows. Here the difficulty would be in maintaining liquid buffer capacity and level in the reservoir cells of the secondary distributor and also back pressure in the primary distributor at low flow rates. This difficulty is overcome by providing conduit means which comprises at least two sections each feeding a discrete group of reservoir cells from a location of the header tank at an elevation spaced from that of the other section(s) as shown in FIGS. 3A, 3B and 3C. Thus two or more primary distributor circuits are provided which are fed by the same header tank but feed different groups of reservoir cells in the secondary distributor. The feeds to these primary distributors are at different elevations within the header tank such that at high rates all of the primary distributors are filled with liquid, but at turndown some are empty. Thus at turndown, only some of the reservoir cells in the secondary distributor will be active, the others will be empty. In this way, liquid levels are always maintained at adequate levels. The arrangement of cells being fed by two primary distributors is such that the liquid irrigation of the packing is still uniform at low rates, although the irrigation density will be half that at high rates.

It is preferred that the distributor of the invention is used in a column packed with structured packing arranged to reduce the effect of column tilt on the liquid-vapor contact within the column. In particular, it is preferred that there are one or more layers of structured packing sheets arranged so that, viewed in the axial direction of the column, packing sheets in the body of each layer are arranged in one or more sections in which at least one band surrounds a central core, said band being formed of segments in which the packing sheets in each segment extend rectilinearly in a different direction to those in the adjacent segments. This arrangement is the subject of our co-pending U.S. patent application Ser. No. 09/009,094 of the same filing date, the disclosure of which is incorporated into the present application by this reference.

The following is a description, by way of example only and with reference to the accompanying drawings, of presently preferred embodiments of the present invention.

Referring first to FIG. 1, a distributor in accordance with a presently preferred embodiment of the present invention comprises a header tank 1 from which a main distribution pipe 2 extends for the delivery of liquid from the header tank. A plurality of pipe branches 3 extend from the main pipe 2 over rows of reservoir cells 4 in a liquid distribution plate 5 (see FIG. 2) located above structural packing 6 in a distillation column (not shown) of a cryogenic air separation unit mounted on a ship (not shown). Each pipe branch 3 has a series of spaced delivery tubes 7 individually aligned with a respective reservoir cell 4 of the respective row.

Figure 2:
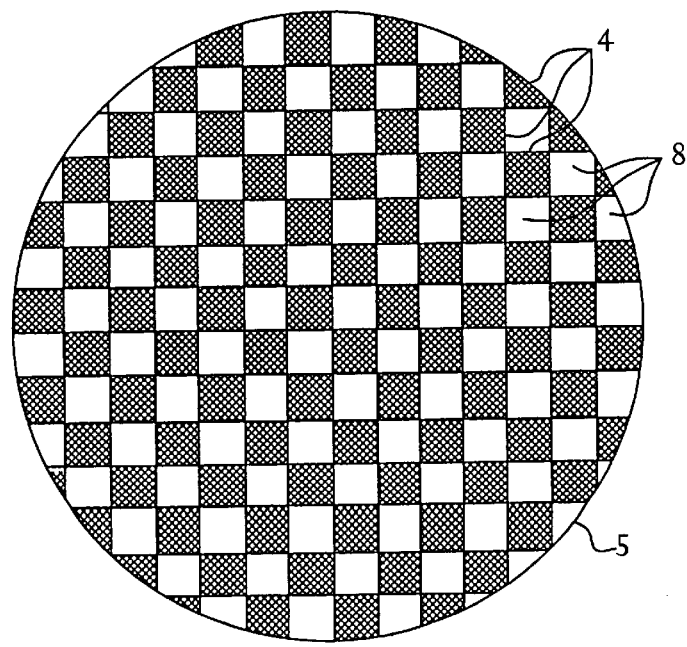

As shown in FIG. 2, the distribution plate 5 is a circular disc covering the whole cross-section of the column above the packing and having identical bores (4,8) of square cross-section formed therein in uniform criss-cross rows. Alternate bores 8 (vapor riser passages) are open at both the top and bottom to permit the free flow of vapor therethrough and the remaining bores 4 (reservoir cells) are blind being closed at their bases except for a central hole (not visible) permitting limited flow of liquid therethrough.

As shown in FIGS. 3A, 3B, and 3C, the distributor 10 in accordance with an embodiment of the invention comprises two distributor circuits fed by header tank 1, the circuits including two main distribution pipes 2, 2' extending from the header tank 1, pipe branches 3, 3' extending from the main pipes 2, 2', and a series of spaced delivery tubes 7, 7' extending from the pipe branches 3, 3' and feeding liquid to reservoir cells 4 aligned therewith.

EXAMPLE

A distributor as described above with reference to the figures is fitted to a shipboard cryogenic air separation column of 2.9 m diameter packed with structured packing sheets in accordance with the teaching of our co-pending U.S. patent application Ser. No. 09/009,094. The column produces about 1000 tons/day (900 tonnes) of oxygen with a liquid flowrate of 0.042 $m^3$/s and a vapor flowrate of 5.04 $m^3$/s. The distributor is dimensioned for ±12° tilting of the column from the vertical with a 15 second period and an average list of 2° from the vertical.

Each reservoir cell in the distribution plate is about 0.050 m×0.050 m square and 0.38 m tall with a hole size of 0.005 m, yielding a 30 second inventory of liquid. The height of the liquid head in the header tank is 1.2 m and the total height of the distributor system is about 3 m. This system gives an overall flow variation of ±5% during operation.

In contrast, if the same column were fitted with a conventional pipe distributor, a liquid head of 7.5 m would be required to achieve ±5% flow variation. The total height of the conventional pipe distributor would be about 9 m (i.e. about 3 times more than is required by the exemplified distributor of the present invention).

It will be understood by those skilled in the art that the invention is not restricted to the specific details described above and that numerous modifications and variation can be made without departing from the scope and equivalence of the following claims.

What we claim is:

1. A liquid distributor for a packed liquid-vapor contact column comprising:

a header tank;

a liquid distribution plate having vapor riser passages and a multiplicity of discrete reservoir cells within the liquid distribution plate, each of the reservoir cells of uniform cross-section arranged in a checkerboard structure having an aperture for flow of liquid therefrom into the column; and conduit means for feeding liquid from the header tank into each of the reservoir cells.

2. The liquid distributor of claim 1 wherein the vapor riser passages and reservoir cells alternate in the liquid distribution plate.

3. The liquid distributor of claim 1 wherein the liquid distribution plate has a perimeter and at least one of the reservoir cells is not located adjacent the perimeter, and wherein each of the reservoir cells not located adjacent the perimeter has a substantially uniform cross-section through the liquid distribution plate.

4. The liquid distributor of claim 1 wherein each reservoir cell is open at its top and has a bottom wall containing said aperture.

5. The liquid distributor of claim 1 wherein the liquid distribution plate has a perimeter and at least one of the reservoir cells is not located adjacent the perimeter, and wherein each of the reservoir cells not located adjacent the perimeter of the liquid distribution plate is of the same shape and size.

6. The liquid distributor of claim 5 wherein the shape is of a rectangular cross-section.

7. The liquid distributor of claim 6 wherein the rectangular cross-section is a square cross-section.

8. The liquid distributor of claim 1 wherein a substantial portion of the liquid distribution plate has a uniform crisscross structure with alternating vapor riser passages and reservoir cells.

9. The liquid distributor of claim 8 wherein the liquid distribution plate has a perimeter and at least one of the vapor riser passages and at least one of the reservoir cells are not located adjacent the perimeter, and wherein each of the vapor riser passages and reservoir cells not located adjacent the perimeter of the liquid distribution plate has a square cross-section.

10. The liquid distributor of claim 1 wherein the conduit means comprises at least two sections each feeding a discrete group of reservoir cells from a location of the header tank at an elevation spaced from that of another at least one section.

11. A liquid distribution plate for a packed liquid-vapor column comprising vapor riser passages and a multiplicity of discrete reservoir cells of uniform cross-section arranged in a checkerboard structure within the liquid distribution plate, each of the reservoir cells having an aperture for flow of liquid therefrom into the column.

12. The liquid distribution plate of claim 11 wherein the vapor riser passages and reservoir cells alternate in the liquid distribution plate.

13. The liquid distribution plate of claim 11 wherein the liquid distribution plate has a perimeter and at least one of the reservoir cells is not located adjacent the perimeter, and wherein each of the reservoir cells not located adjacent the perimeter has a substantially uniform cross-section through the liquid distribution plate.

14. The liquid distribution plate of claim 11 wherein each reservoir cell is open at its top and has a bottom wall containing said aperture.

15. The liquid distribution plate of claim 11 wherein the liquid distribution plate has a perimeter and at least one of the reservoir cells is not located adjacent the perimeter, and wherein each of the reservoir cells not located adjacent the perimeter of the liquid distribution plate is of the same shape and size.

16. The liquid distribution plate of claim 15 wherein the shape is of a rectangular cross-section.

17. The liquid distribution plate of claim 16 wherein the rectangular cross-section is a square cross-section.

18. The liquid distribution plate of claim 11 wherein a substantial portion of the liquid distribution plate has a uniform criss-cross structure with alternating vapor riser passages and reservoir cells.

19. The liquid distribution plate of claim 18 wherein the liquid distribution plate has a perimeter and at least one of the vapor riser passages and at least one of the reservoir cells are not located adjacent the perimeter, and wherein each of the vapor riser passages and reservoir cells not located adjacent the perimeter of the liquid distribution plate has a square cross-section.

20. An exchange column for exchanging heat and/or mass between a liquid and a vapor, the exchange column having at least one liquid distributor as in claim 1.

21. A process for cryogenic air separation comprising contacting vapor and liquid counter-currently in at least one distillation column containing at least one mass transfer zone, wherein liquid-vapor contact is established by at least one packing and wherein a liquid and a vapor are distributed to or from the packing by a liquid distributor as in claim 1.

* * * * *